United States Patent [19]

Davies

[11] 4,358,242

[45] Nov. 9, 1982

[54] CORE EXTRACTION AND INSERTION APPARATUS

[75] Inventor: John B. C. Davies, Lanarkshire, Scotland

[73] Assignee: Industrial and Overseas Securities Limited, Lanarkshire, Scotland

[21] Appl. No.: 102,983

[22] Filed: Dec. 11, 1979

[51] Int. Cl.³ .............................................. B66F 11/00
[52] U.S. Cl. ...................................... 414/746; 29/726; 91/445; 91/527; 414/909
[58] Field of Search ................... 414/746, 909; 29/726; 254/108, 111; 294/67 R, 67 AA; 91/424, 445, 527; 212/156, 160, 197, 198, 195; 104/94

[56] References Cited

U.S. PATENT DOCUMENTS

| | | | |
|---|---|---|---|
| 3,239,076 | 3/1966 | Huff et al. ...................... | 294/67 R X |
| 3,257,001 | 6/1966 | Postlewaite et al. ............... | 414/746 |
| 3,836,015 | 9/1974 | Travis .................................. | 414/746 |
| 3,880,086 | 4/1975 | Khondker ............................. | 104/94 |
| 3,918,536 | 11/1975 | Deeter et al. .................... | 414/909 X |
| 3,954,187 | 5/1976 | Van der Woerd .................. | 414/746 |
| 3,972,420 | 8/1976 | Stock et al. .......................... | 212/160 |
| 4,053,062 | 10/1977 | Travis .................................. | 414/746 |
| 4,227,854 | 10/1980 | Coffey .................................. | 414/746 |

OTHER PUBLICATIONS

Prepared Papers 1; Refinery Experience with the Hydraulic Tube–Bundle Extractor.

Primary Examiner—Leslie J. Paperner
Attorney, Agent, or Firm—Cushman, Darby & Cushman

[57] ABSTRACT

Apparatus primarily for use in extracting and re-inserting heat exchanger tube bundles in chemical processing plants. An elongated frame structure having first and second pairs of spaced parallel beams is provided, with a carriage attachable to the tube bundle and moveable along the frame structure first beams in response to actuation of extraction cylinders. No portion of the frame structure extends above the first parallel beams, and an arm is mounted on each corner of the structure, pivotal about an axis perpendicular to the direction of tube withdrawal, and a cable extending from a central crane is mounted on each arm. A cylinder pivots each arm about its axis to change the position of the supporting crane back relative to the center of gravity of the structure. A pair of moveable side arms with clamps are provided for engaging a flange on the heat exchanger shell, and attitude control slings are also provided. Control for all of the power elements associated with the apparatus is provided by a control console connected by an umbilical to the apparatus, a pneumatic pilot control system including an air motor for powering hydraulic pumps providing the control function. A plurality of trolleys each having individually pivotal leaves are associated with the second pair of beams and rollable along and with respect to those beams, supporting the core at various points therealong during withdrawal.

25 Claims, 7 Drawing Figures

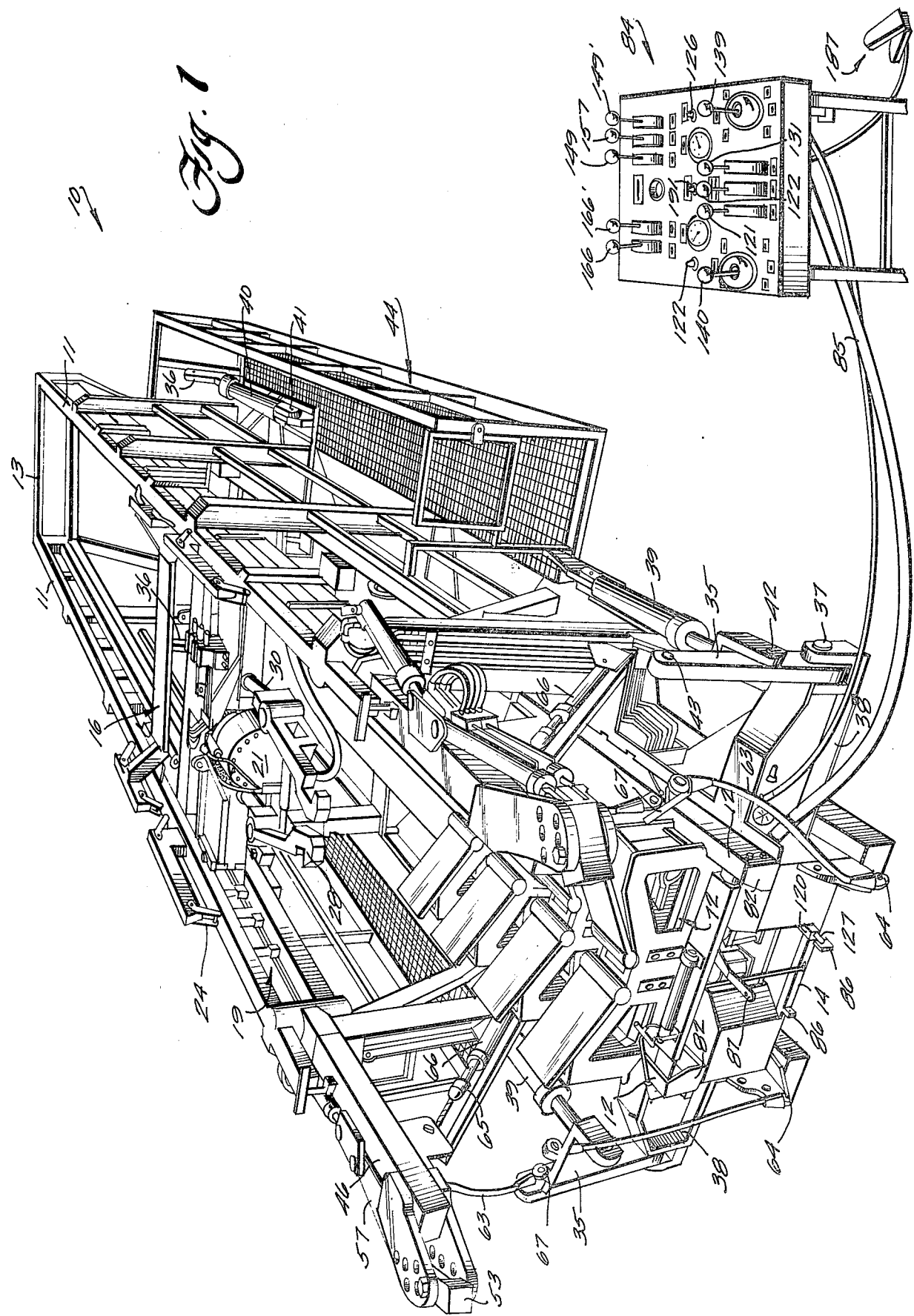

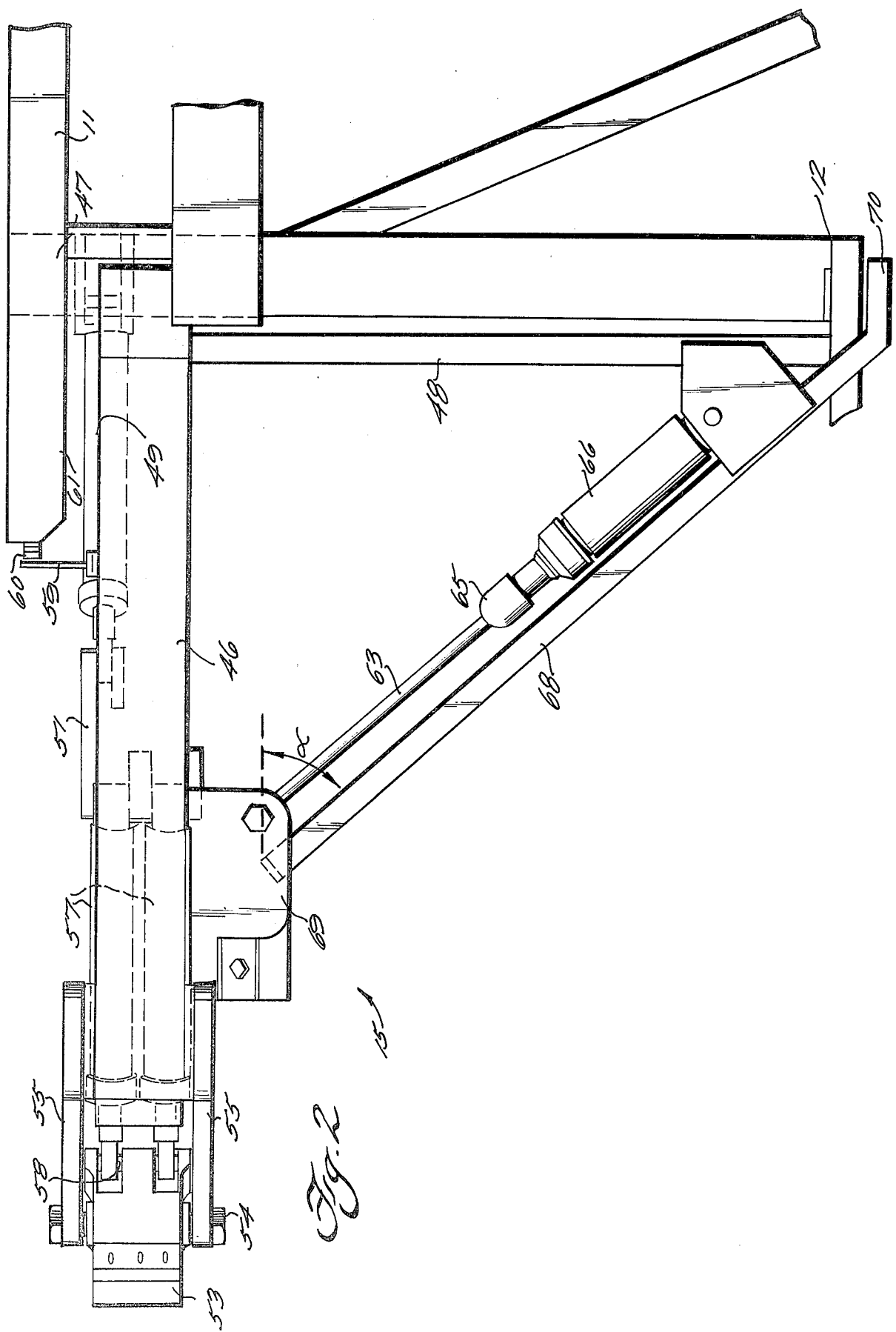

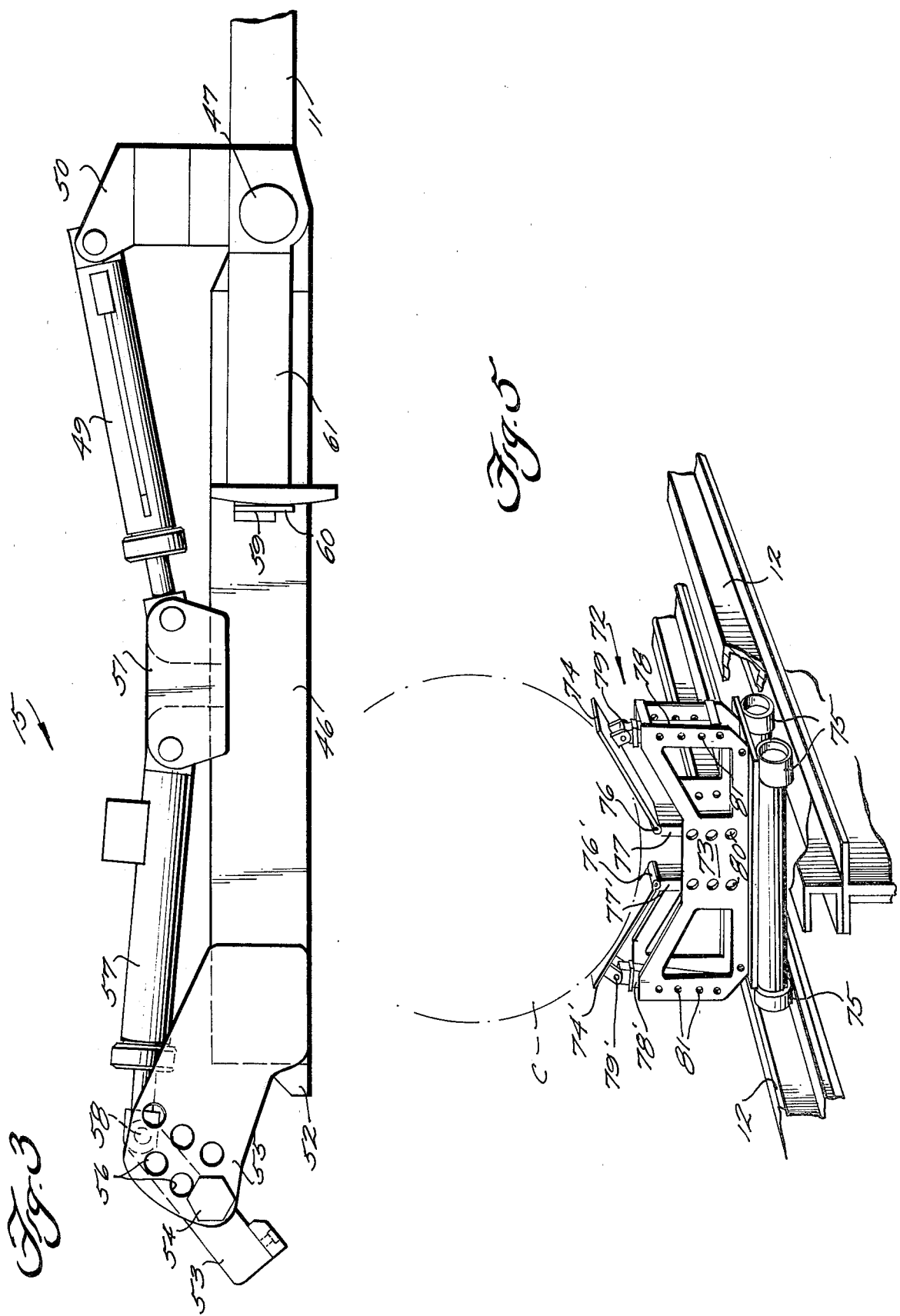

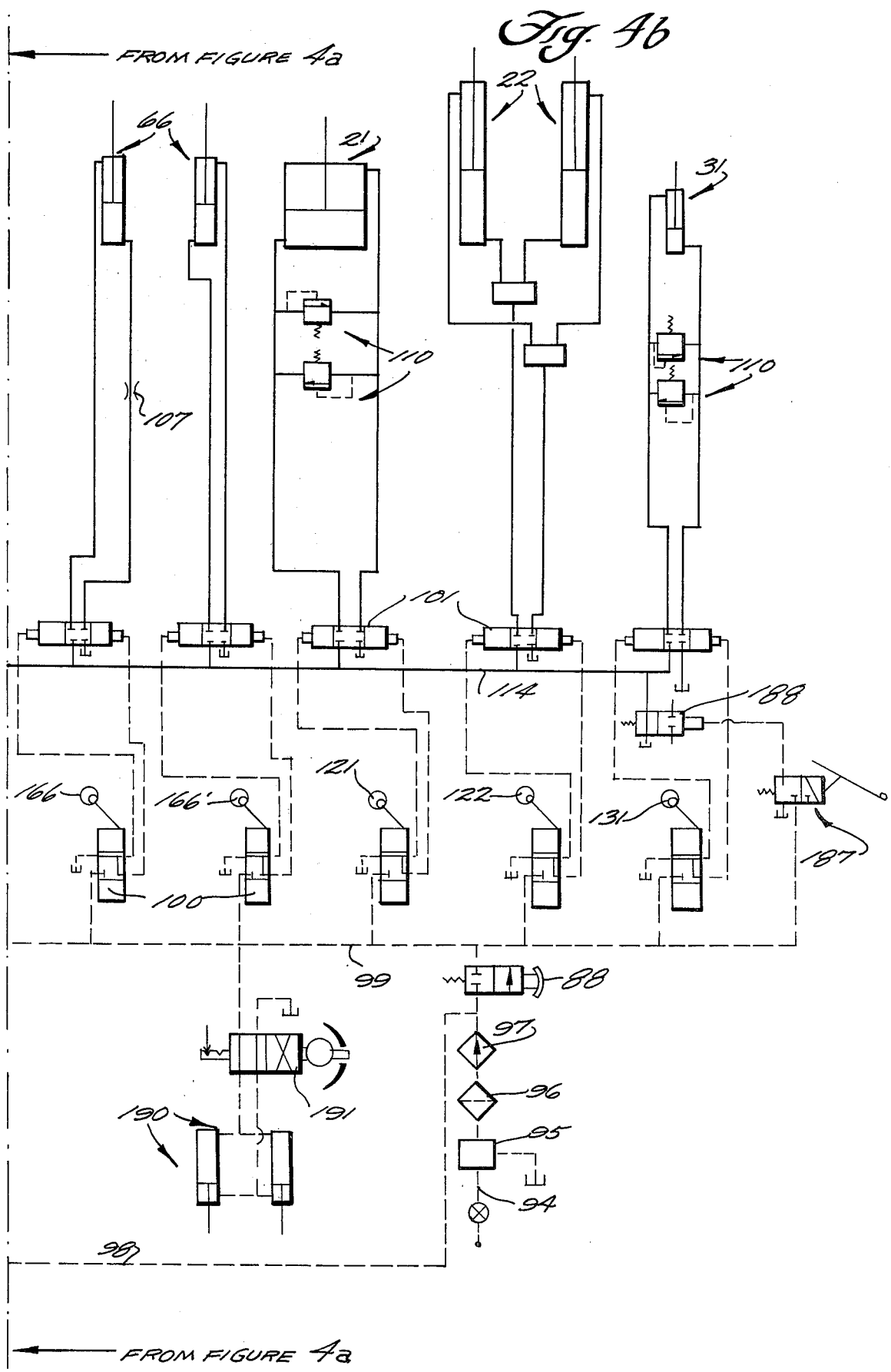

CORE EXTRACTION AND INSERTION APPARATUS

BACKGROUND AND SUMMARY OF THE INVENTION

The invention relates to improved apparatus for linearly moving a massive core into and out of a shell, and is primarily designed for the extracting and reinsertion of heat exchanger tube bundles from and into heat exchanger shells in chemical processing plants. An exemplary prior art apparatus for effectively performing the tube bundle extraction and reinsertion functions is described in copending Application Ser. No. 923,443 filed July 10, 1978, now U.S. Pat. No. 4,227,854, the disclosure of which is hereby incorporated by reference herein. While the structure disclosed therein as well as other removal structures (such as shown in U.S. Pat. No. 4,053,062) have been acceptable for performing their intended functions, there have been some drawbacks associated therewith.

Some prior art structures are difficult to properly balance during tube bundle removal, and it is important that such balancing be accomplished in as simple and effective a manner as possible in order to insure quick and effective removal of the core without damage to the tube bundles. Additionally, there have been safety problems associated with some prior art structures since an operator must stay with the structure during the removal operations in order to control the functioning thereof, and the operator can be vulnerable under some circumstances in such a position. Additionally, other prior art structures have been somewhat limited in being able to properly position the core for quick and effective reinsertion into the shell, have had shell clamping structures that did not readily adapt to differently sized cores and shells with which the apparatus might be utilized, and have not been adapted for gradual—rather than abrupt—release of the removal structure from the heat exchanger shell after a core withdrawal.

According to the present invention, apparatus is provided which overcomes many of the drawbacks inherent in prior art structures, and in general provides a core extraction device which is properly positionable, is easily safely operated, and can perform the extraction and reinsertion functions with a great deal of precision in a relatively short period of time. The apparatus according to the invention is also adaptable for use in a total core maintenance system so that the removed core can be properly handled without ever attaching a sling to the core, thus minimizing the chances for damage to the tube bundles.

The apparatus according to the present invention basically comprises an elongated frame structure including a first pair of parallel beams, means for connecting and locking the frame structure to the shell, a moveable carriage operatively mounted for movement along and with respect to the spaced first beams toward and away from the shell, the carriage having means for interconnection to the core, means operatively associated with the carriage for exerting a force thereon for moving it toward and away from the shell, and a plurality of thrust surfaces associated with the frame structure for cooperating with the force exerting means. The force exerting means and the thrust surfaces may be identical to those disclosed in copending Application Ser. No. 923,443.

One improved aspect of the apparatus according to the present invention is the provision of balance control means operatively mounted on the frame structure for taking into account changes in the location of the center of gravity of the apparatus-core combination during removal or insertion, and during supporting of the core removed from the shell, the balance control means comprising a plurality of members mounted on spaced portions of the frame structure; means for mounting the members on the frame structure for movement toward and away from the center of gravity of the frame structure; and powered means for effecting movement of the members toward and away from the center of gravity of the frame structure. Preferably, the members include four arms, one disposed at each corner of the frame structure, and the mounting means comprise pivot means for mounting each of the arms for pivotal movement about an axis perpendicular to the direction of elongation of the frame structure. The powered means preferably comprise a fluid actuated piston and cylinder assembly for each arm mounted at one end thereof to the elongated frame structure and the other end thereof to the arm for moving the arm about the pivot means. Each of the arms receives a cable from a crane, the cables in turn being connected to a beam which in turn is connected by a pair of cables to a single crane hook. No portion of the frame structure extends above the first parallel beams, and the carriage is moveable along the parallel beams in a direction coincident with the central axis of the core, and the arms are mounted on the frame structure below the first beams.

According to another improved aspect of the apparatus according to the present invention, the means for connecting and locking the elongated frame structure to the shell comprises a pair of side arms, each located opposite the other on opposite sides of the elongated frame structure at substantially the central axis of the core. The side arms are operatively mounted to the frame structure for pivotal movement about an axis perpendicular to the direction of movement of the carriage and power means are provided for pivoting the side arms about these axes. A stationary clamp element is formed on each of the side arms, and a moveable clamp element is pivotally mounted to each of the side arms for movement about an axis parallel to the side arm axes, further power means being provided being mounted on each of the side arms associated with each of the moveable clamp elements for pivoting the elements about their axes. Such apparatus further includes attitude sling means including a powered linear force application device mounted on a support arm associated and pivotal with each of the side arms.

The apparatus according to the present invention also includes control means for all the power means associated therewith, the control means including a control console, and means for detachably mounting the control console to the frame structure. An umbilical extends from the control console to the power means, the umbilical having sufficient length to allow the control console to be mounted in a position safely spaced from the frame structure during utilization of the apparatus for moving a massive core. The power means preferably comprise hydraulic cylinder assemblies and include at least one hydraulic pump for providing hydraulic fluid under pressure for powering the hydraulic cylinder assemblies. The apparatus further comprises a pneumatic pilot control system for controlling operation of the hydraulic cylinder assemblies, the pneumatic control system including a pneumatic motor for powering the hydraulic pump and control means including pneumatic valves and manual actuators therefor, the actuators being mounted on the control console.

According to another aspect of the present invention, the elongated frame structure also includes a second pair of parallel beams disposed below the first pair of beams, and a plurality of trolleys mounted for guided movement along and with respect to the second pair of parallel beams. Each of the trolleys comprises a body portion, a pair of individually adjustable leaves, the leaves being pivotally mounted to the body portion, actuator means for individually pivoting each of the leaves about its pivotal mounting to move a portion thereof toward and away from the body, and a plurality of wheels mounting the body for rolling movement along the second parallel beams. The beams preferably comprise channels for receiving the wheels along three sides thereof and have readily removeable means for blocking movement of the wheels out of the front ends of the channels, and the plurality of wheels comprises two spaced sets of wheels. The body has no portion thereof extending below the wheels, and the frame structure comprises no components interfering with movement of the wheels out of the front ends of the second beams when the blocking means are removed.

It is the primary object of the present invention to provide improved apparatus for linearly moving a massive core into and out of a shell. This and other objects of the invention will become clear from an inspection of the detailed description of the invention, and from the appended claims.

BRIEF DESCRIPTION OF THE DRAWING

FIG. 1 is a perspective view of an exemplary apparatus according to the present invention;

FIG. 2 is a side detail view of exemplary means for connecting and locking the frame structure of the apparatus to a heat exchanger shell;

FIG. 3 is a top plan view of the structure of FIG. 2;

FIGS. 4a and 4b provide a schematic fluid-circuitry diagram of exemplary controls and inter-relations between components, according to the present invention;

FIG. 5 is a detail perspective view of an exemplary trolley according to the present invention.

DETAILED DESCRIPTION

Figure 6:
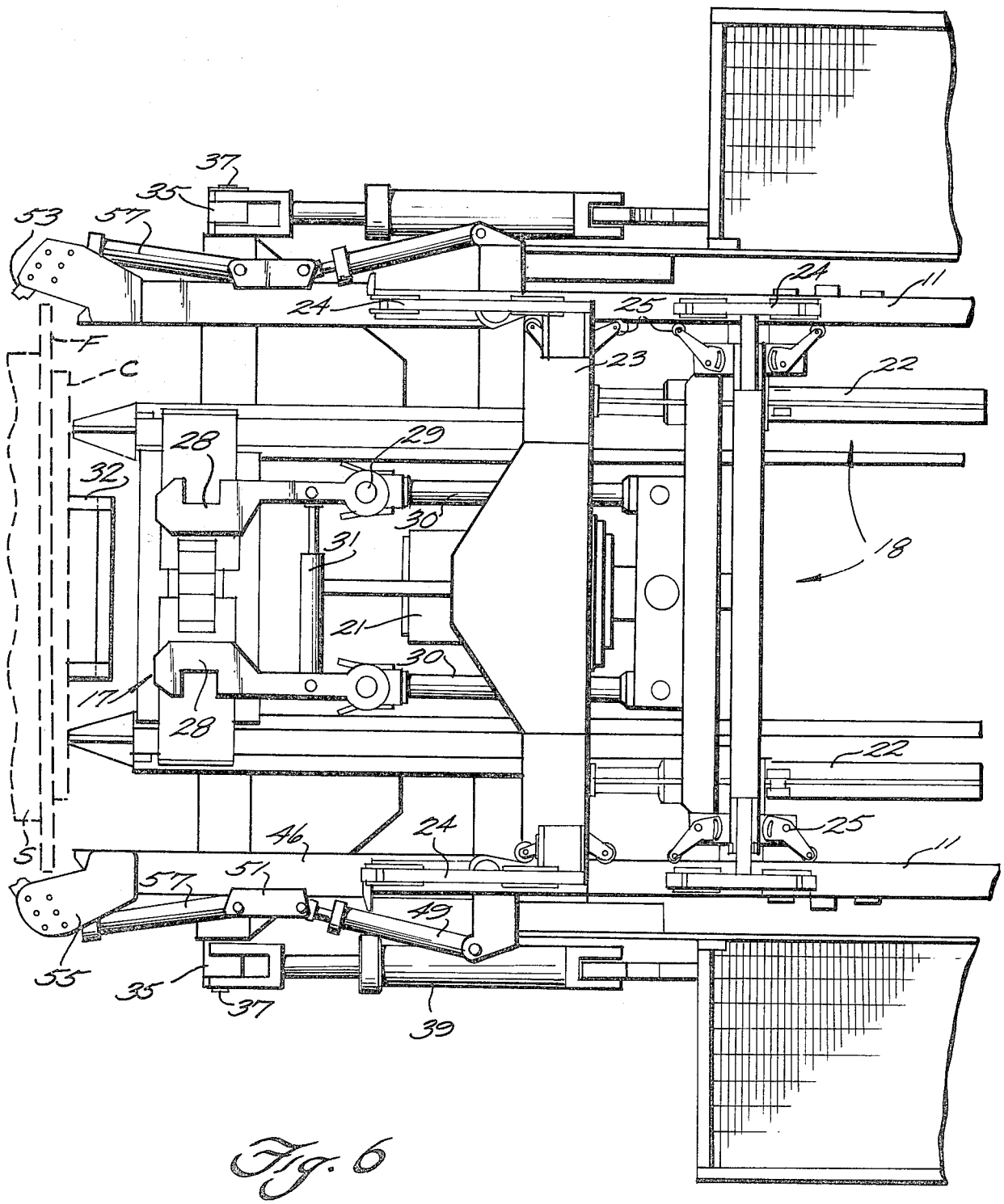
FIG. 6 is a detail top plan view of the carriage of the apparatus of FIG. 1.

The apparatus according to the present invention includes the following basic components:

An elongated frame structure 10 including a first pair 11 of parallel beams, and a second pair 12 of spaced parallel beams, disposed beneath the first pair 11, and various interconnecting cross-components, including cross bars 13 and 14. Means for connecting and locking the elongated frame structure 10 to the shell S (see dotted line structure in FIG. 6), the connecting and locking means illustrated generally at 15 (see FIGS. 2 and 3 in particular). A moveable carriage, shown generally at 16, operatively mounted for movement along and with respect to the spaced beams 11 toward and away from the shell S, the carriage 16 having means 17 for interconnection to the core C (see FIG. 6). Power means illustrated generally at 18, associated with the carriage for exerting a force on the carriage 16 for moving it toward and away from the shell S; and thrust surfaces, indicated generally at 19 in FIG. 1, associated with the frame structure (beams 11) for cooperating with the force exerting means 18 to effect unidirectional movement of the carriage 16 with respect to the beams 11.

The particular force exerting means 18 utilized according to the present invention preferably includes a single main linear force exerting structure, such as a hydraulic cylinder, 21, and a plurality (pair) of auxiliary linear force exerting structures (e.g., hydraulic cylinders) 22, such as shown in copending Application Ser. No. 923,443, the disclosure of which is hereby incorporated by reference herein. The structures are mounted to a cross bar 23 which is mounted for guided movement along the beams 11 by a plurality of top and side rollers sets 24, 25 respectively, the main cross bar 23 and the auxiliary cross bars 26 cooperating with the roller systems 24, 25 to provide the basics of the carriage 16. The means 17 associated with the carriage 16 for interconnection with the core preferably comprises a structure such as illustrated in FIGS. 4 and 5 of the copending Application Ser. No. 923,443, including a pair of hook arms 28 mounted for pivotal movement about pivot points 29 and guide rods 30 which slide with respect to the main cross bar 23, and are operatively attached to the cross bar 26. A hydraulic cylinder or like power means 31 acts between the hooks 28 to move them toward and away from each other to grasp or release a pulling plate 32 (see FIG. 6) which is adapted to be bolted to the front plate of the core C. The thrust surfaces 19 are preferably of the type described in the copending Application Ser. No. 923,443, with particular reference to FIGS. 6–8 thereof.

According to one important aspect of the apparatus according to the present invention, balance control means are provided for taking into account changes in the location of the center of gravity of the apparatus-core combination during removal of insertion of the core into the shell, and during supporting of the core removed from the shell. The balance control means preferbly comprise a plurality of members mounted on spaced portions of the frame structure 10 for movement toward and away from the center of gravity of the frame, and power means for effecting movement of said members toward and away from the center of gravity. The members preferably comprise four arms including front balance arms 35 and rear balance arms 36 substantially identical to the front arms 35. The mounting means for the arms 35, 36 preferably comprise pivot pins or like pivot means 37 for mounting each of the arms at one end thereof on the outside corners of the frame structure 10, such as to apertunances 38 extending outwardly from the bottom beams 12. The power means comprise a fluid action (preferably hydraulic) piston and cylinder assembly for each arm, such as the front cylinders 39 and the rear cylinders 40. Each cylinder assembly 39, 40 is pivotally mounted at one end thereof to the frame structure 10 (such as a plate 41 extending outwardly therefrom—See FIG. 1 and is pivotally mounted to the arm 35 at 42. Each of the arms 35 comprises an aperture 43 or the like formed therein for receipt of a cable from a crane. Preferably each of the four cables connected to the arms 35, 36 at the apertures 43 thereof are operatively connected to a free support beam (not shown), which in turn is connected to a single crane hook of a conventional overhead crane. It is noted that the arms 35, 36 are mounted on the support structures 38 or the like which are laterally spaced from the beams 11, 12. Additionally, it is desirable to provide the center of gravity of the entire apparatus below the center line of the core C being removed, therefore no significant portion of the elongated frame structure 10 extends above the upper parallel beams 11. The frame structure 10 also may comprise a walkway 44 or the like disposed on either side thereof.

The preferred means 15 for connecting and locking the elongated frame structure 10 to the shell S, according to the present invention, are illustrated most clearly in FIGS. 1-3. Such means include a pair of side arms 46, each located opposite the other on opposite sides of the frame structure at substantially the central axis of the core C to be removed; a shaft 47, or like means, for operatively mounting the side arms 46 to the frame structure 10 (as operatively mounting it between the beams 11 and 12 and extending through a rigid support 48 or the like operatively connected between the beams 11, 12) for pivotal movement with respect to the frame structure 10 about an axis perpendicular to the direction of movement of the carriage 16; and power means, such as hydraulic cylinder 49, associated with each side arm 46 for pivoting it about its respective axis. The cylinders 49 are connected between a plate 50 extending outwardly from and rigidly connected to the frame structure 10, and a flange 51 mounted on arm 46.

The means 15 further comprise a stationary clamp element 52 formed on each of the side arms 46, and a moveable clamp element 53, pivotally mounted—as by pivot pin 54—to each of the side arms 46, as to a plate 55 extending therefrom. Preferably the plate 55 has a plurality of apertures 56 formed therein for receipt of the pivot pin 54 to adjust the initial position of the moveable clamp element 53 with respect to the stationary clamp element 52. The axis defined by the pin 54 is parallel to the axis defined by the shaft 47. Power means, such as a tandem set of hydraulic cylinders 57, is pivotally mounted to each of the side arms 46 (as to bracket 51) and pivotally mounted to the moveable clamp elements 53 (as by pin 58) for pivoting the moveable elements 53 about their axes. A moveable indicator structure 59 preferably is provided on arm 46 for cooperation with a scale 60 having different color regions mounted on an extension 61 of the beam 11, the indicators 59, 60 allowing the determination of the angular positions of the arms 46 with respect to the beams 11, and thus, with respect to each other.

The means 15 further comprises attitude sling means including a sling 63 associated with each side arm 46 and operatively connected at one end 64 thereof to the frame structure 10, and operatively connected at the other end 65 thereof to a powered linear force application device, such as a hydraulic cylinder 66, the sling extending in front of the frame structure 10. Each sling 63 is a steel cable or the like, and preferably includes a sling plate 67 intermediate the ends 65, 64 thereof, which plate 67 is adapted to be bolted to the conventional bolt flange F (see FIG. 6) on a conventional heat exchanger shell S. A support arm 68 is associated with each of the side arms 46 and substantially coplanar therewith (in a vertical plane) and operatively abuts the side arms 46 at an acute angle (see FIG. 2). The linear force application device 66 are preferably mounted on the support arms 68, extending substantially parallel thereto. Each support arm 68 is rigidly operatively connected to the side arm 46 (as through bracket 69) at one end thereof, and for rotation with the shaft 47 at the other end 70 thereof. A pulley (not shown) with a radiused groove (having no flat groove portions), or like structure, may be associated with the bracket 69 for guiding the cable 63 as it is acted upon by the cylinder 66 or the like.

According to another aspect of the present invention, a plurality of trolleys 72 (see FIGS. 1 and 5 in particular) are mounted for guided movement along and with respect to the second parallel beams 12. The beams 12, as most clearly illustrated in FIG. 5, preferably are formed as channels. Each trolley 72 comprises a body portion 73, a pair of individually adjustable leaves 74, 74' and a plurality of wheels (preferably provided in two spaced sets of two each) 75 mounting the body 73 for rolling movement along the beams 12. Each leaf, 74, 74' is pivotally mounted at a first end 76, 76' thereof to a support member 77, 77' rigidly attached to the body 73, and an actuator means 78, 78' is associated with each of the leaves 74, 74'. The actuator means 78, 78' preferably comprise a linear force application device, such as a hand-operated hydraulic jack, the jack being pivotally connected at one end thereof to the body portion 73, and at the other end thereof being pivotally connected to a free end portion of the leaf 74, 74', as illustrated at 79 and 79' in FIG. 5. The relative point of connection of the support 77, 77' and the jack 78, 78' with respect to the body portion 73 may be adjusted by disposition and any one of a plurality of apertures 80, 81 respectively formed in the body portion 73.

It is noted that the body portion 73 of channel 72 may be constructed so that it has no portion thereof extending below the wheels 75, and the frame structure 10 comprises no component interfering with movement of the wheels out of the front ends of the channels 12. The channels 12 receive the wheels 75 along three sides thereof (see FIG. 5). Readily removeable plates 82 (see FIG. 1) or like means are mounted on the front open ends of the channels 12. Once the plates 82 are removed, it is possible to wheel the trolley 72 out of the front ends of the channels 12, and thus to structures remote from the frame structure 10.

The wheels 75 are conical in section. The channels 12 along which they run are standard channels with a drop angle of about 5°. The cooperation between the conical wheels 75 and the channels 12 provides the trolleys with an inherent self-aligning capability under load.

Control means are provided for all of the power means associated with the apparatus. Preferably the control means include a control console 84 (see FIG. 1), with an umbilical 85 extending from the control console to the various power means (e.g., cylinders 21, 22, 31, 39, 40, 49, 57 and 66) and having sufficient length to allow the console 84 to be mounted safely spaced from the frame structure 10 during utilization of the apparatus for moving a massive core C. Means are provided for detachably mounting the control console to the frame structure, such as brackets 86, shown schematically in FIG. 1. Interlocking means are provided between the frame structure 10 and the console 84 for automatically preventing operation of any of the controls of the console 84 when the console 84 is received by the bracket 86 or like detachably mounting means. Such interlocking may be accomplished utilizing a mechanical projection 87 that moves the main air valve 88 to the off position when the console is mounted on the frame structure 10; conventional electrical interlocking means; or like conventional structure.

The power means (i.e., cylinders 21, 22, 31, etc.) preferably comprise hydraulic cylinder assemblies and preferably a pneumatic pilot control system means is provided according to the invention for controlling operation of the hydraulic cylinder assemblies. The control console includes actuator elements which are a part of the pneumatic pilot control system, and a pneumatic motor 90 (see FIG. 4a) is provided for powering at least one hydraulic pump (e.g., fixed displacement hydraulic pumps 91, 92 in FIG. 4a) for providing hydraulic fluid under pressure to the hydraulic cylinder assemblies 21, etc.

Figure 4A:
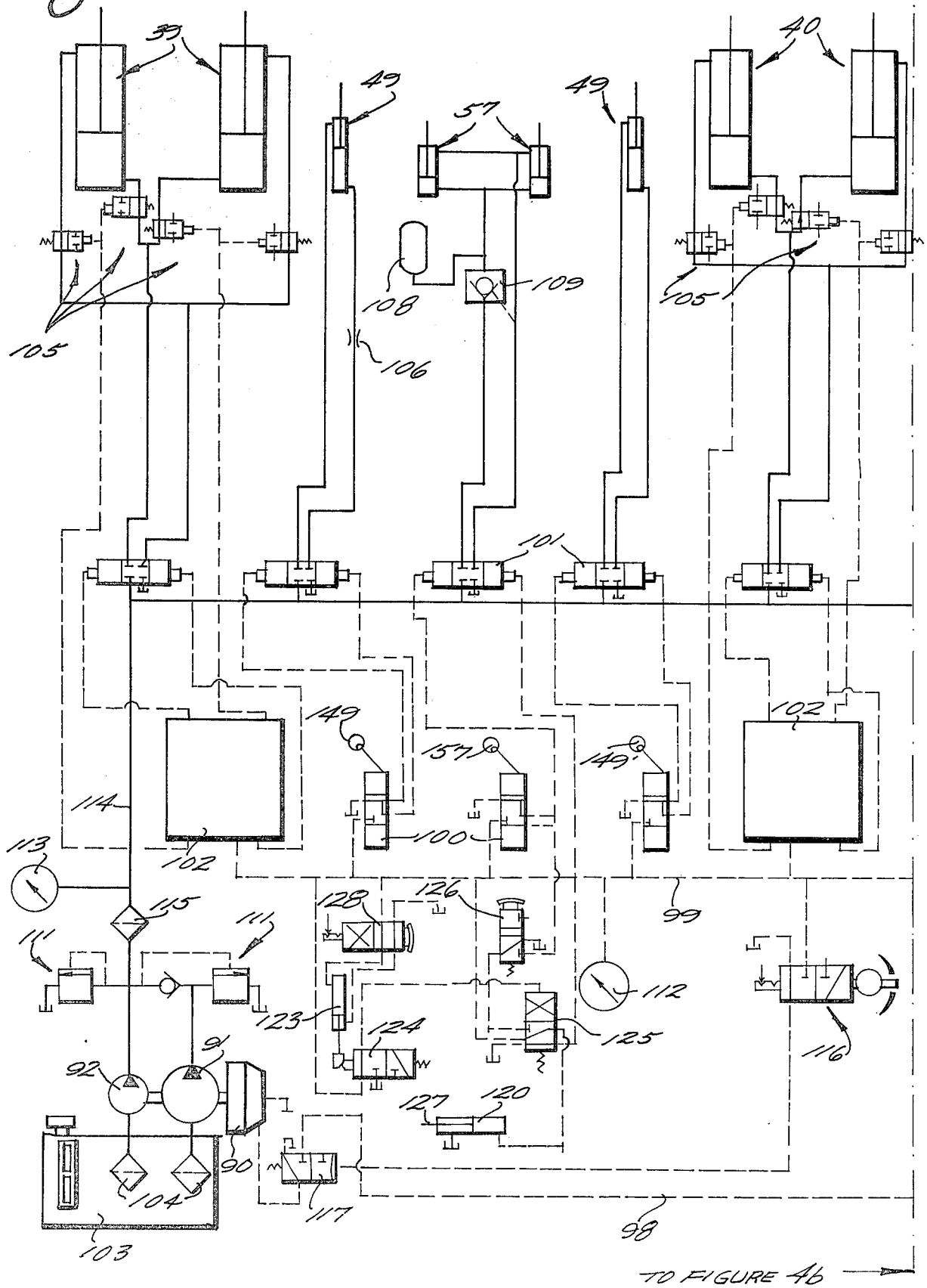

An exemplary hydraulic system according to the present invention is illustrated in FIGS. 4a and 4b, the conduits containing the hydraulic fluid being shown in solid line, and the pneumatic pilot control circuitry is also shown in FIGS. 4a and 4b, the air conduits being shown in dotted line. Exemplary suitable hydraulic and pneumatic control elements, such as valves, indicators, and the like, are also shown in FIGS. 4a and 4b, and the actual actuators for the various pneumatic control valves are shown in FIG. 1 as well as in FIGS. 4a and 4b. Of course, the exact positioning of the control elements on the console 84 is not critical, but may be varied to suit particular needs.

The pneumatic control line includes a main line 94 which is connectable up to a source of pressurized gas at the site, preferably a 400 CFM 100 psi air line. The main line 94 may be connected through a conventional reservoir 95, fluid filter 96, and/or fluid conditioner 97 to a control conduit 98 ultimately leading to the air motor 90 and through the main air valve 88 to the feeder line 99 for the rest of the pneumatic components. All the components of FIGS. 4a and 4b are illustrated utilizing conventional symbols, including conventional three-position pneumatic valves 100, associated with various control elements, a three-position pilot controlled hydraulic valve 101 associated with each hydraulic cylinder or group of cylinders, and schematic control assemblies 102 for the balance cylinders 39, 40. A hydraulic reservoir 103 is operatively connected through conventional filters 104 or the like to the hydraulic pumps 91, 92. All the cylinders include integral lock valves to maintain the cylinders in locked position in the event of hose or power failure.

As illustrated in FIGS. 4a and 4b, normally open pilot controlled two position valves 105 or the like are disposed in the hydraulic circuitry for the balance cylinders 39, 40, a flow restriction 106 is associated with the hydraulic line for the cylinder 49 for the left side arm, a restriction 107 is disposed in the hydraulic line for the left sling control cylinder 66, an accumulator 108 and pilot operated check valve 109 are associated with the clamp cylinders 57, and pressure responsive infinite position normally closed valves 110 or the like are provided interconnected between the opposite hydraulic supply lines for the main cylinder 21 and hook control cylinder 31. Pressure relief valves 111 are operatively associated with the hydraulic pumps 91, 92, and a pressure indicator 112, 113 respectively is provided for each of the pneumatic and hydraulic lines. The main feeder hydraulic line 114 passes through filter 115 to the various hydraulic valves 101.

The air motor control valve is indicated at 116 as a two-position detented valve, operatively controlling a pressure responsive valve 117 operatively connected between the air supply line 98 and the air motor 90.

Brake means are preferably provided for selectively preventing movement of the carriage 16 with respect to the frame structure 10. Such brake means may take the form of a brake cylinder 123, mounted to the carriage 16, and having the rod element 127 thereof moveable to a position wherein it is received by the frame structure 10 (such as an opening in a beam 11), or in other suitable manners. The brake cylinder 123 is controlled by a manually actuated two-position detented valve 128. As a safety interlock, the two-position spring offset pilot valve 124 is actuated which in turn actuates spring offset pilot valve 125. This occurs when cylinder 123 reaches the end of its travel and prevents the side arm clamps 53 from being released unless the brake is correctly applied. The rod element 127 of cylinder 120 extends whenever the carriage brake 123 is not applied and prevents the control console 84 from being fitted on the machine, thus the machine cannot be transported if the carriage brake is not correctly applied.

A manually actuated clamp release valve 126 also is preferably associated with the pneumatic pilot controls for the clamp cylinders 57.

In the drawings, the following control levers are associated with the pneumatic pilot control systems for the indicated hydraulic cylinders: 121, the main thrust cylinder 21; 122, the auxiliary extraction cylinders 22; 131, the hook control cylinder 31; the joy stick 139, the control component 102 for the front balance arms 39; joy stick 140, the control component 102 for the rear balance arms 40; lever 149, the left arm control cylinder 49; control lever 149', the right arm control cylinder 49; control lever 157, the clamp control cylinders 57; and control levers 166 and 166', the left and right attitude sling control cylinders 66, respectively.

In FIG. 4b, valve 187 is a foot-operated dead man valve that the operator must keep depressed to maintain hydraulic pressure since it controls a hydraulic dump valve 188 operatively connected to the main hydraulic feeder line 114.

Pneumatic cylinders 190, operated by a two-position detented manual pneumatic valve 191, may be utilized to change the operating mode of the ratchet pawls (thrust surfaces 19) to enable the direction of travel of the carriage 16 to be altered at will. The actuator for valve 191 is on the control console 84.

OPERATION

An exemplary operation utilizing the apparatus according to the present invention will now be described.

Cables are connected up to each of the apertures 43 and the balance control arms 39, 40, and the cables are in turn connected up to a suitable lifting beam which in turn is connected to a conventional overhead crane. The console 84 is detached from the brackets 86, and is positioned in a safe place remote from the frame structure 10 (e.g., on the ground, or on scaffolding) so that the operator may have as clear a view of the apparatus functions as possible. The main pneumatic line 94 is then connected up to an existing 100 psi air line, and the main air valve 88 is opened automatically by removal of the console 84 from brackets 86, and air motor 90 control valve 116 (which may be mounted on the air motor 90, which is mounted on the frame structure 10 along with the hydraulic pumps 91, 92 and hydraulic reservoir 103) is operated to actuate pressure responsive valve 117 to start the air motor 90. The air motor 90 operates the hydraulic pumps 91, 92 which supply fluid through the main hydraulic feeder line 114.

The carriage 16 is moved by controlling the cylinders 21, 22 with levers 121, 122, to the front of the apparatus, and the brake valve 128 is actuated, in turn, actuating the brake cylinder 123 latching the carriage 16 to the frame structure 10. All the trolleys (preferably four trolleys) 72 are brought to the front of the apparatus—as illustrated in FIG. 1—and are latched into position by a manual catch (not shown) on channels 12. The crane is then operated to lift the extractor apparatus, taking the entire weight thereof, front balance indicators are checked to determine whether or not the unit is level.

The side arms 46 are opened to their widest position by actuating cylinders 49 with control levers 149, 149', and utilizing the indicators 59, 60 the arm on the far side of the extractor from the console 84 is placed at the position corresponding to the diameter of the heat exchanger shell S which is to be acted upon. This arm is then not moved again until the extraction is complete.

The main cylinder 21 is then moved by controlling the lever 121 to move the attachment hooks 28 away from the core C. A chalk mark, or like easily visible mark, is made on the shell S indicating the horizontal center line of the tube bundle. The pulling plate 32 is bolted to the core C in a position to receive the hooks 28.

Controlling the crane, the extractor apparatus is then maneuvered to place the fixed side arm over the bolt flange F on the center line, and by controlling the other arm cylinder 49, the other arm 46 is brought into position adjacent the flange F. Utilizing lever 157, the clamp cylinders 57 are then actuated to move the moveable clamping element 53 into engagement with the rear face of the bolt flange F, sandwiching the bolt flange F between it and the stationary clamp element 52. The indicators 59, 60 at both arms are checked, and if they indicate the same color then the position is appropriate. If the same colors are not indicated the arms are simultaneously moved, by actuating the levers 149, 149', until the same colors show.

The sling plates 67 are then bolted at a suitable position on the bolt flange F, the level indicators are again checked (controlling the levers 139, 140 to achieve level if the frame 10 is out of line), and the main cylinder 21 is actuated to cause the attachment hooks 28 to ride up and grip the pulling plate 32. The main cylinder 21 is then actuated to extract the tube bundle approximately twelve inches, and with the thrust surfaces 17 in the withdraw position, extraction is continued controlling the cylinders 22 with the control lever 122 until the tube bundle is even with the innermost trolley, (i.e., it is passed over the three frontmost trolleys) 72. Then the hand jacks 78, 78' on that trolley 72 are operated to bring both leaves 74, 74' thereof firmly into contact with the tube bundle C but not applying a force tending to raise the bundle. At this and subsequent stages of the extraction, the level indicators are again checked, and the balance cylinders 39, 40 operated, as necessary to properly position the frame 10.

Bundle withdrawal is continued, operating control level 122 using the trolley 72 at predetermined convenient points to support the tube bundle at suitable baffle plates, each trolley 72 in turn having the leaves thereof brought into contact with bundle C so that it may roll along the channels 12 with the tube bundle C as it is extracted. The extraction process is continued until only about eighteen inches of the bundle remains to be withdrawn, at which time the carriage brake is applied by actuating the valve 128, and by utilizing the hand jacks 78, 78' associated with the last trolley 72, the leaves 74, 74' are utilized to raise the entire bundle slightly to ensure that no weight is carried by the shell S. Withdrawal is continued utilizing the cylinders 22 until the bundle is approximately six to twelve inches clear of the shell S, and then the carriage brake is again applied.

After initial extraction, the levers 166, 166' are actuated to cause the cylinder 66 to pull the sling 63 tight, and then the clamp release valve 126 is operated to release both clamp cylinders 57. Since an interconnection is provided between the clamp release button 126 and the carriage brake system 123, 124, etc. (see FIG. 4a), the clamp will not release if the carriage brake is not correctly applied. The side arms 46 are not moved at this point.

With the clamps released, the sling cylinders 66 are gradually operated to slacken the slings 63, and the apparatus is carefully observed to see which way, if any, it tends to move. The balance control arm cylinders 39, 40 are operated to adjust the position of the extractor if necessary, and the cylinders 66 are operated until the slings 63 are both slack. Then the sling plates 67 are disconnected from the bolt flange F, the levers 149, 149' are operated to actuate the cylinders 49 to pivot the side arms 46 outwardly about their shafts 47, and the crane is actuated to move the extractor away from the shell S to a safe position.

Once the extractor is at a safe position, the valve 116 is operated to shut off the air motor 90, the air supply source 94 is cut off, and the console 84 is connected to the bracket 86 or the like on the frame structure 10. If it is desired to remove the core from the frame structure 10 for cleaning or repair thereof, it is not necessary to utilize slings, but rather the front blocking plates 82 may merely be removed and the entire tube bundle—supported by the trolley 72—rolled off of the channels 12 onto a suitable support surface, and ultimately moved to the desired locations.

Reinsertion of the tube bundle after it is acted upon is accomplished by reversing the above sequence of steps, except that the final adjustment of the bundle alignment to the shell is achieved after clamping by individually adjusting the trolley leaves 74, 74', to properly vertically position and/or rotate the core C so that it is perfectly in line.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent apparatus and devices.

What is claimed is:

1. Apparatus for linearly moving a massive core into and out of a shell, comprising: an elongated frame structure including a pair of parallel spaced beams; means for connecting and locking said elongated frame structure to the shell; a moveable carriage operatively mounted for movement with respect to said spaced beams toward and away from the shell, said carriage having means for interconnection to the core; means operatively associated with said carriage for exerting a force on said carriage for moving said carriage toward and away from the shell; and thrust surfaces associated with said frame structure for cooperating with said force exerting means for effecting movement of said carriage with respect to said beams; means for receipt of a structure for supporting the apparatus on a crane hook; balance control means operatively mounted on said frame structure for adjusting the position of said crane supporting structure to take into account changes in the location of the center of gravity of the apparatus-core combination during removal or insertion of the core from or into the shell, and during supporting of the core removed from the shell, said balance control means comprising: four arms, comprising said means for receipt of a crane supporting structure, mounted on spaced portions of said frame structure, each of said arms including means for receipt of a cable from a crane; means for mounting said members on said frame structure for movement toward and away from the center of gravity of said frame structure, said mounting means comprising pivot means for mounting each of said arms at one end thereof on the corners of said frame structure for pivotal movement about an axis perpendicular to the direction of elongation of said frame structure; and power means for effecting movement of said members toward and away from the center of gravity of said frame structure.

2. Apparatus as recited in claim 1 wherein said power means comprise a fluid-actuated piston and cylinder assembly for each arm mounted at one end thereof to said elongated frame structure and at the other end thereof to said arm for moving said arm about said pivot means.

3. Apparatus as recited in claim 1 wherein said cables are operatively connected to a single crane hook.

4. Apparatus as recited in claim 1 wherein said arms are mounted on support means below and laterally spaced from said beams, and further comprising a plurality of moveable trolleys mounted for movement along said support means.

5. Apparatus as recited in claim 1 wherein no portion of said frame structure extends above said parallel beams, and wherein said carriage is moveable along said parallel beams in a direction coincident with the central axis of the core, and wherein said arms are mounted on said frame structure below said beams.

6. Apparatus for linearly moving a massive core into and out of a shell, comprising: an elongated frame structure including a pair of parallel spaced beams; a moveable carriage operatively mounted for movement with respect to said spaced beams toward and away from the shell, said carriage having means for interconnection to the core; means operatively associated with said carriage for exerting a force on said frame for moving said frame toward and away from the shell; and thrust surfaces associated with said frame structure for cooperating with said force exerting means to effect unidirectional movement of said carriage with respect to said beams; wherein the improvement comprises
means for connecting and locking said elongated frame structure to the shell, said means comprising a pair of side arms, each located opposite the other on opposite sides of said elongated frame structure at substantially the central axis of the core; means for operatively mounting said side arms to said frame structure for pivotal movement with respect to said frame structure about an axis perpendicular to the direction of movement of said moveable carriage; power means for pivoting said side arms about an axis; a stationary clamp element formed on each of said side arms; a moveable clamp element pivotally mounted to each of said side arms for movement about an axis parallel to said side arm axes; and power means mounted on each of said side arms associated with each of said moveable clamp elements for pivoting said moveable clamp elements about their axes.

7. Apparatus as recited in claim 6 further comprising attitude sling means including a sling associated with each side arm operatively connected at one end thereof to said frame structure, and operatively connected at the other end thereof to a power linear force application device, said sling extending in front of said frame structure.

8. Apparatus as recited in claim 7 further comprising a support arm associated and pivotal with each of said side arms and substantially coplanar therewith, and abutting said side arm at an acute angle; and wherein a said linear force application device is mounted on each of said support arms, the linear force applied thereby extending substantially parallel to said support arm.

9. Apparatus for linearly moving a massive core into and out of a shell, comprising: an elongated frame structure including a pair of parallel spaced beams; means for connecting and locking said elongated frame structure to the shell; a moveable carriage operatively mounted for movement with respect to said spaced beams toward and away from the shell, said carriage having means for interconnection to the core; power means for effecting powered movement of said carriage with respect to said beams and power means for effecting connecting and locking of said elongated frame structure to the shell; and thrust surfaces associated with said frame structure for cooperating with said power means for effecting powered movement of said carriage to effect movement of said carriage with respect to said beams; wherein the improvement comprises
control means for said power means, said control means including: a control console; means for detachably mounting said control console to said frame structure so that said console is movable to an operative position in a stationary area completely detached from said elongated frame and the rest of said apparatus associated therewith; and an umbilical extending from said control console to said power means, said umbilical having sufficient length to allow said control console to be mounted safely spaced from said frame structure in said stationary area during utilization of said apparatus for moving a massive core.

10. Apparatus as recited in claim 9 further comprising brake means for selectively preventing movement of said carriage with respect to said frame structure.

11. Apparatus as recited in claim 9 further comprising balance control means operatively mounted on said frame structure for taking into account changes in the location of the center of gravity of the apparatus-core combination during removal or insertion of the core, said balance control means comprising four arms, each of said arms including means for receipt of a cable from a crane and being pivotally mounted adjacent a bottom portion of said frame structure for movement toward and away from the center of gravity of said frame structure about an axis perpendicular to the direction of elongation of said frame structure, and a hydraulic cylinder assembly associated with each of said arms for effecting movement thereof about said pivot means; said control means effecting control of said hydraulic cylinder assemblies associated with said arms.

12. Apparatus as recited in claims 1, 7, or 9 wherein said parallel beams are first beams and receive said carriage structure so that said carriage is moveable along said parallel beams, and wherein said frame structure further comprises a pair of bottom second parallel beams vertically spaced from and below said first parallel beams; and further comprising a plurality of trolleys mounted for guided movement with respect to said second parallel beams, each of said trolleys comprising a body portion; a pair of individually adjustable leaves, said leaves pivotally mounted to said body portion; actuator means for individually pivoting each of said leaves about its pivotal mounting to move a portion thereof away from or toward said body; and two spaced sets of wheels mounting said body for rolling movement along a flat surface.

13. Apparatus as recited in claims 6, or 9 wherein no portion of said frame structure extends above said parallel beams, and wherein said carriage is moveable along said parallel beams in a direction coincident with the central axis of the core, and further comprising balance control means including arms mounted on said frame structure below said beams.

14. Apparatus for linearly moving a massive core into and out of a shell, comprising: an elongated frame structure including a first pair of parallel spaced beams, and a second pair of parallel spaced beams disposed below said first pair of beams; means for connecting and locking said elongated frame structure to the shell; a moveable carriage operatively mounted for movement along and with respect to said spaced first beams toward and away from the shell, said carriage having means for interconnection to the core; means operatively associated with said frame for exerting a force on said carriage for moving it toward and away from the shell; thrust surfaces associated with said frame structure for cooperating with said force exerting means to effect unidirectional movement of said carriage with respect to said first beams; and a plurality of trolleys mounted for guided movement along and with respect to said second parallel beams, each of said trolleys comprising a body portion, a pair of individually adjustable leaves, said leaves pivotally mounted to said body portion, actuator means for individually pivoting each of said leaves about its pivotal mounting to move a portion thereof toward and away from said body, and a plurality of wheels mounting said body for rolling movement along said second parallel beams.

15. Apparatus as recited in claim 14 wherein each of said actuators comprises a hand-operated hydraulic jack.

16. Apparatus as recited in claim 14 wherein said wheels comprise two spaced sets of wheels and wherein said second beams comprise channels for receiving said wheels along three sides thereof; and further comprising readily removeable means for blocking movement of said wheels out of the front ends of said channels.

17. Apparatus as recited in claim 16 wherein said frame structure comprises no component interfering with movement of said wheels out of the front ends of said second beams when said blocking means are removed.

18. Apparatus as recited in claims 14, 15, or 17 wherein each of said leaves is pivoted at a first end thereof to a support member rigidly attached to said body at a central portion of said body, and wherein each of said actuators is pivotally mounted at one end thereof to a second end of its associated leaf, and at the other end thereof to a side portion of said body.

19. Apparatus as recited in claim 14 wherein no portion of said frame structure extends above said first parallel beams, and wherein said carriage is moveable along said first parallel beams in a direction coincident with the central axis of the core, and further comprising balance control means including arms which are pivotally mounted on said frame structure below said first beams.

20. Apparatus as recited in claim 14 wherein each of said wheels is conical in cross-section and cooperates with said beams to provide inherent self-aligning.

21. Apparatus for linearly moving a massive core into and out of a shell, comprising: an elongated frame structure including a pair of parallel spaced beams; means for connecting and locking said elongated frame structure to the shell; a moveable carriage operatively mounted for movement with respect to said spaced beams toward and away from the shell, said carriage having means for interconnection to the core; power means for effecting powered movement of said carriage with respect to said beams and power means for effecting connecting and locking of said elongated frame structure to the shell; and thrust surfaces associated with said frame structure for cooperating with said power means for effecting powered movement of said carriage to effect movement of said carriage with respect to said beams; control means for said power means, said control means including a control console, means for detachably mounting said control console to said frame structure, and an umbilical extending from said control console to said power means, said umbilical having sufficient length to allow said control console to be mounted safely spaced from said frame structure during utilization of said apparatus for moving a massive core; and interlocking means between said frame structure and said console for automatically preventing operation of any controls of said control console when said control console is received by said means for detachably mounting said control console on said frame structure.

22. Apparatus as recited in claims 9 or 21 wherein said power means comprise hydraulic cylinder assemblies, and further comprising a pneumatic pilot control system for controlling operation of said hydraulic cylinder assemblies, said control console including actuator elements comprising a component part of said pneumatic pilot control system; and a pneumatic motor for powering at least one hydraulic pump for providing hydraulic fluid under pressure to said hydraulic cylinder assemblies.

23. Apparatus for linearly moving a massive core into and out of a shell, comprising: an elongated frame structure including a pair of parallel spaced beams, means for connecting and locking said elongated frame structure to the shell; a moveable carriage operatively mounted for movement with respect to said spaced beams toward and away from the shell, said carriage having means for interconnection to the core; power means for effecting powered movement of said carriage with respect to said beams and power means for effecting connecting and locking of said elongated frame structure to the shell; and thrust surfaces associated with said frame structure for cooperating with said power means for effecting powered movement of said carriage to effect movement of said carriage with respect to said beams; said power means comprising hydraulic cylinder assemblies and including at least one hydraulic pump for proving hydraulic fluid under pressure for powering said hydraulic cylinder assemblies; and further comprising a pneumatic pilot control system means for controlling operation of said hydraulic cylinder seemblies, said pneumatic control system including a pneumaic motor for powering said at least one hydraulic pump and control means including pneumatic valves and manual actuators therefor; and further comprising balance control means operatively mounted on said frame structure for taking into account changes in the location of the center of gravity of the apparatus-core combination during removal or insertion of the core, said balance control means comprising four arms, each of said arms including means for receipt of a cable from a crane and being pivotally mounted adjacent a bottom portion of said frame structure for movement toward and away from the center of gravity of said frame structure about an axis perpendicular to the direction of elongation of said frame structure, and a hydraulic cylinder assembly associated with each of said arms for effecting movement thereof about said pivot means; said control means effecting control of said hydraulic cylinder assemblies associated with said arms.

24. Apparatus for linearly moving a massive core into and out of a shell, comprising: an elongated frame structure including a pair of parallel spaced beams, means for connecting and locking said elongated frame structure to the shell; a moveable carriage operatively mounted for movement with respect to said spaced beams toward and away from the shell, said carriage having means for interconnection to the core; power means for effecting powered movement of said carriage with respect to said beams and power means for effecting connecting and locking of said elongated frame structure to the shell; and thrust surfaces associated with said frame structure for cooperating with said power means for effecting powered movement of said carriage to effect movement of said carriage with respect to said beams; said power means comprising hydraulic cylinder assemblies and including at least one hydraulic pump for providing hydraulic fluid under pressure for powering said hydraulic cylinder assemblies; and further comprising a pneumatic pilot control system means for controlling operation of said hydraulic cylinder assemblies, said pneumatic control system including a pneumatic motor for powering said at least one hydraulic pump and control means including pneumatic valves and manual actuators therefor; and wherein said parallel beams are first beams and receive said carriage structure so that said carriage is moveable along said parallel beams, and wherein said frame structure further comprises a pair of bottom second parallel beams vertically spaced from and below said first parallel beams; and further comprising a plurality of trolleys mounted for guided movement with respect to said second parallel beams, each of said trolleys comprising a body portion; a pair of individually adjustable leaves, said leaves pivotally mounted to said body portion; actuator means for individually pivoting each of said leaves about its pivotal mounting to move a portion thereof away from or toward said body; and two spaced sets of wheels mounting said body for rolling movement along a flat surface.

25. Apparatus for linearly moving a massive core into and out of a shell, comprising: an elongated frame structure including a pair of parallel spaced beams, means for connecting and locking said elongated frame structure to the shell; a moveable carriage operatively mounted for movement with respect to said spaced beams toward and away from the shell, said carriage having means for interconnection to the core; power means for effecting powered movement of said carriage with respect to said beams and power means for effecting connecting and locking of said elongated frame structure to the shell; and thrust surfaces associated with said frame structure for cooperating with said power means for effecting powered movement of said carriage to effect movement of said carriage with respect to said beams; said power means comprising hydraulic cylinder assemblies and including at least one hydraulic pump for providing hydraulic fluid under pressure for powering said hydraulic cylinder assemblies; and further comprising a pneumatic pilot control system means for controlling operation of said hydraulic cylinder assemblies, said pneumatic control system including a pneumatic motor for powering said at least one hydraulic pump and control means including pneumatic valves and manual actuators therefor; wherein no portion of said frame structure extends above said parallel beams; wherein said carriage is moveable along said parallel beams in a direction coincident with the central axis of the core; and further comprising balance control means including arms mounted on said frame structure below said beams.

* * * * *